United States Patent [19]
Spencer

[11] Patent Number: 5,651,651
[45] Date of Patent: Jul. 29, 1997

[54] TAMPER RESISTANT FASTENING ASSEMBLY AND METHOD OF USE

[76] Inventor: Paul E. Spencer, 23302 S. Normandie Ave., Torrance, Calif. 90502

[21] Appl. No.: 697,027

[22] Filed: Aug. 16, 1996

[51] Int. Cl.[6] .................. F16B 19/00; F16B 33/00; F16B 43/00
[52] U.S. Cl. .................. 411/372; 411/377; 411/431; 411/910
[58] Field of Search .................. 411/372, 373, 411/377, 429, 431, 908, 910; 29/525.1; 403/408.1

[56] References Cited

U.S. PATENT DOCUMENTS

| | | | |
|---|---|---|---|
| 4,136,598 | 1/1979 | Hughes | 411/372 |
| 4,601,624 | 7/1986 | Hill | 411/373 |
| 4,621,230 | 11/1986 | Crouch et al. | 411/910 X |
| 5,068,956 | 12/1991 | Malewicz | 411/431 X |
| 5,175,665 | 12/1992 | Pegg | 411/377 X |

*Primary Examiner*—Neill R. Wilson
*Attorney, Agent, or Firm*—Timothy T. Tyson; Ted Masters

[57] ABSTRACT

A two part fastening assembly 30 for use with a common fastener 500 such as a screw, bolt, or the like includes a substantially ring-shaped base member 32 having a washer-shaped element 38 attached to one end. Washer-shaped element 38 has a hole 42 sized to accept the shank 504 of common fastener 500. Base member 32 has a plurality of circumferentially spaced apertures 48. A substantially bowl-shaped cap 34 has a corresponding plurality of legs 60 having barbs 62. The shank 504 of common fastener 500 is inserted into base member 32 and into hole 42 until head 502 abuts washer-shaped element 38. Cap 34 is then inserted into base member 32, covering head 502, and barbs 62 snap into apertures 48 and are captively engaged thereby.

8 Claims, 5 Drawing Sheets

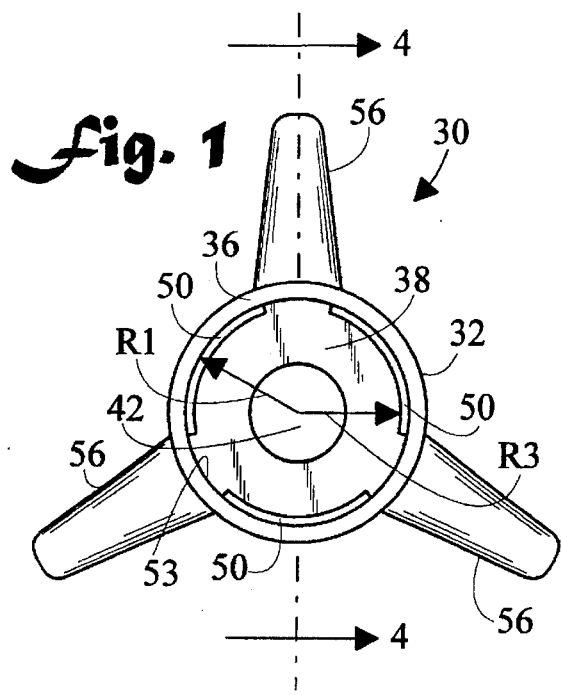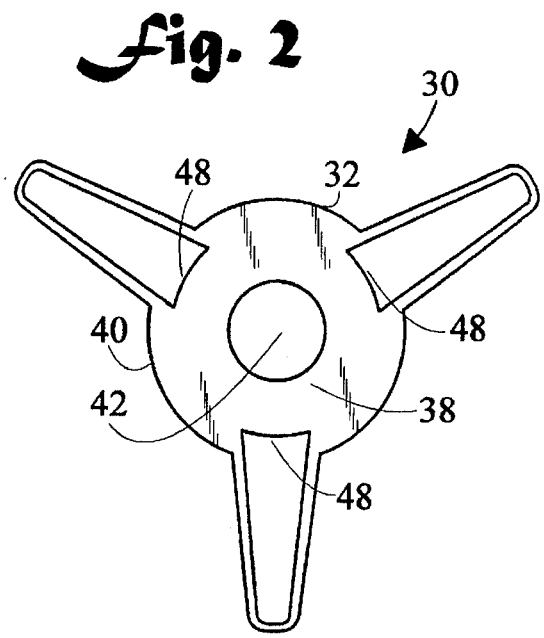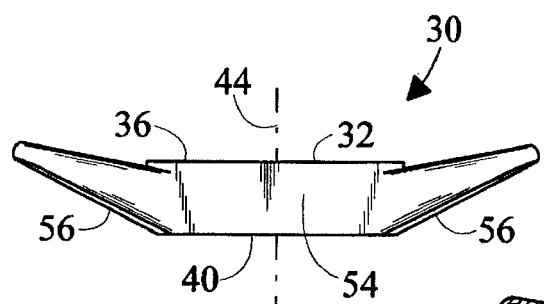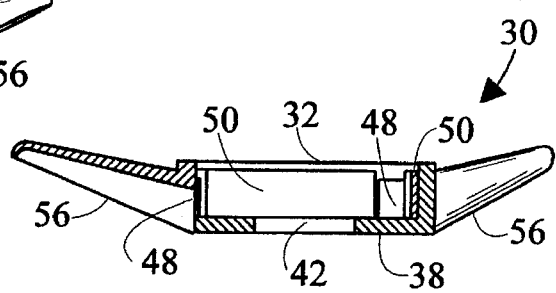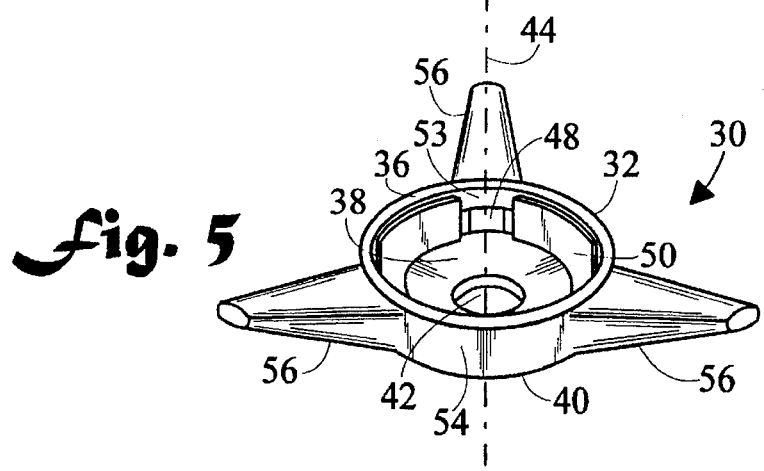

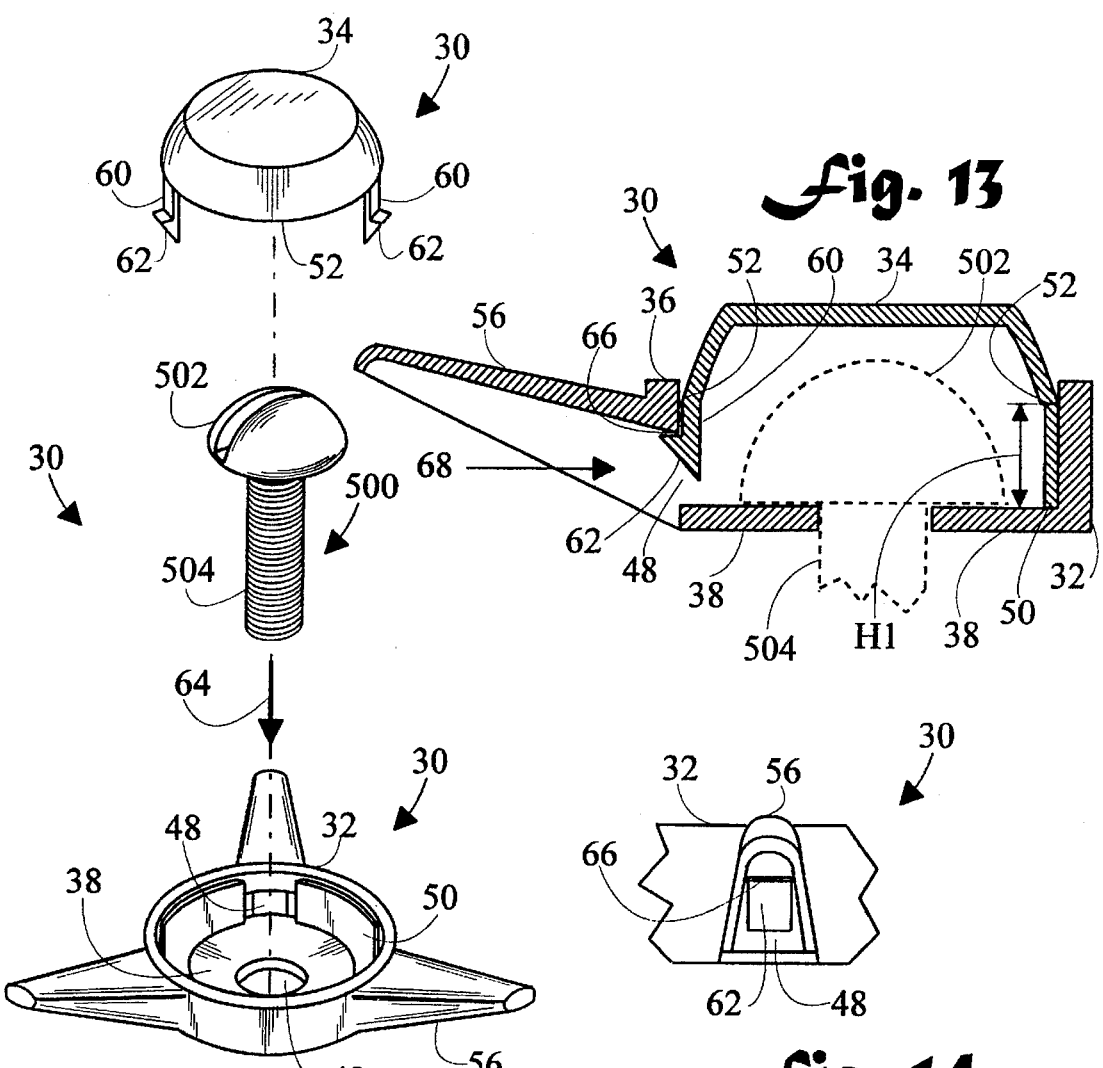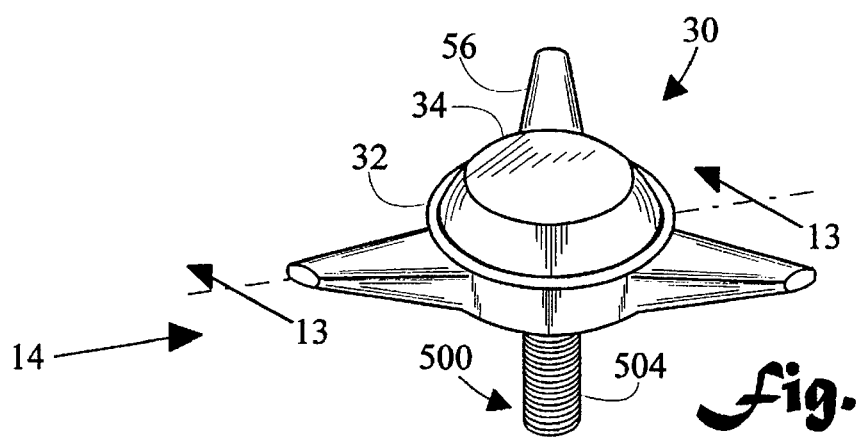

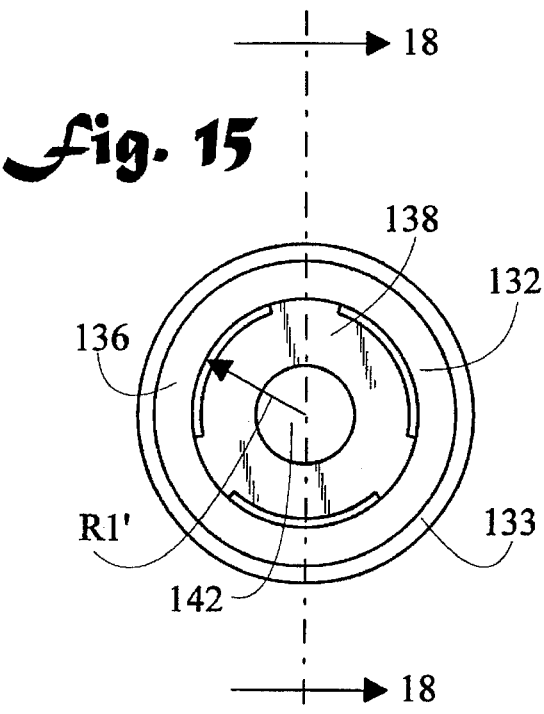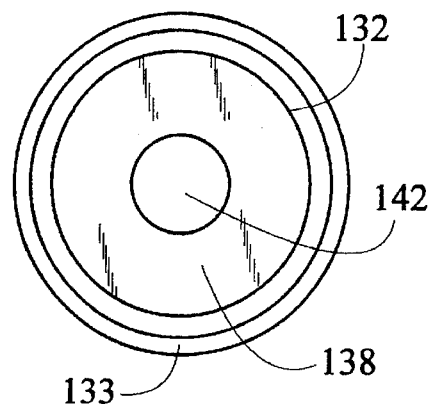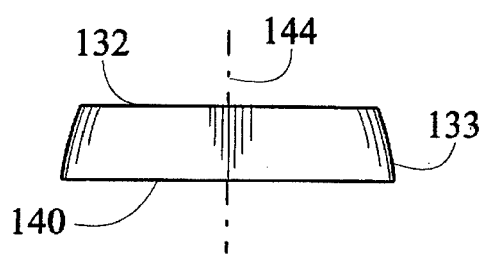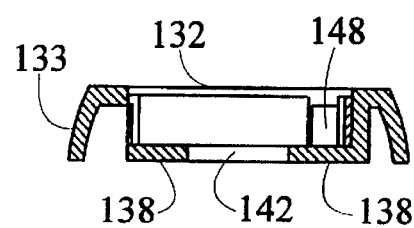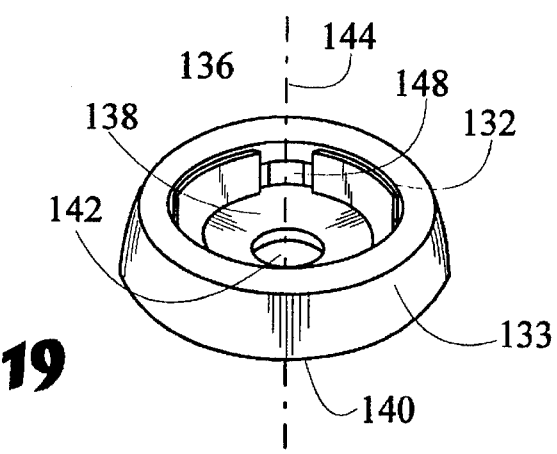

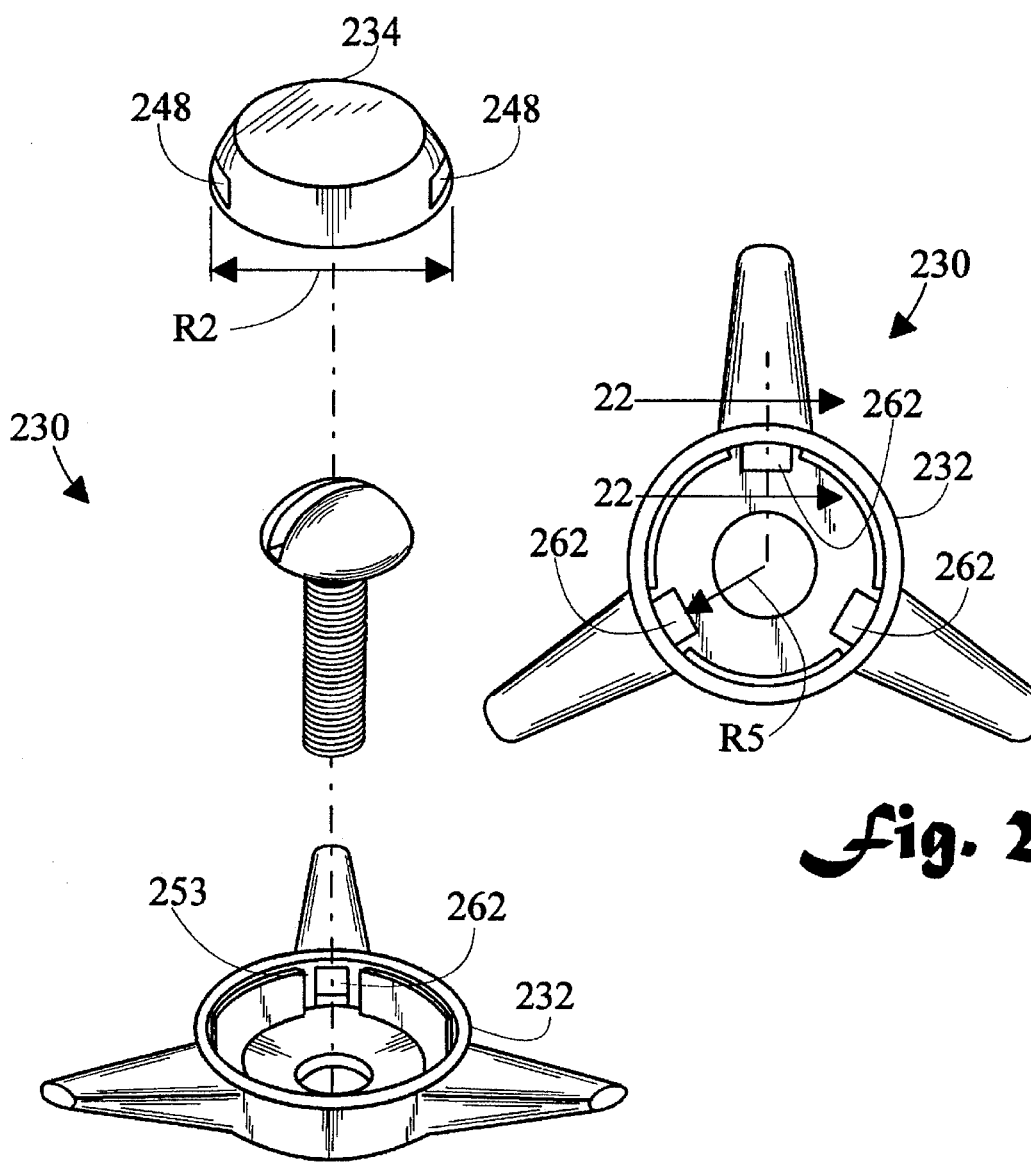
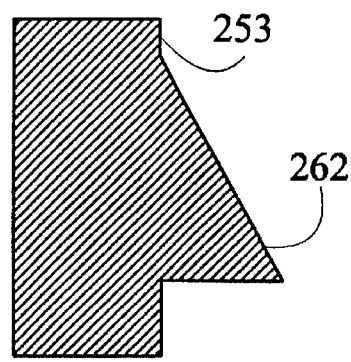
fig. 20
fig. 21
fig. 22

TAMPER RESISTANT FASTENING ASSEMBLY AND METHOD OF USE

TECHNICAL FIELD

The present invention pertains to fastening assemblies for use in conjunction with common fasteners such as a screws, bolts, and the like, and in particular to a fastening assembly which covers the head of the common fastener and thereby provides an obstruction to unauthorized access.

BACKGROUND ART

Fastening assemblies are well known in the art. These devices typically comprise a common fastener to which a variety of structural attachments have been added to enhance the operation of the fastener. For example, U.S. Pat. No. 1,855,931 shows a license plate fastener for protecting license tags issued by the various state governments. The device consists of a fragile cover, preferably made of glass or porcelain, which must be destroyed in order to remove the license plate, thereby providing a direct indication of tampering. U.S. Pat. No. 2,003,595 defines a head pin which permits grasping so that the hand of an operator will not slip in turning the pin. The head has a cap and a peripheral flange which is provided with corrugations, preferably of the knurled type. U.S. Pat. No. 3,557,654 depicts a watertight plastic headed fastener. The fastener has a metal shank with a screw thread thereon and having a molded plastic hexagon head with an integral scaling washer, especially adapted to be used as a weather-resistant threaded fastener for outdoor use in securing a building panel to structural framework. U.S. Pat. No. 3,930,432 discloses a fastening assembly comprising an anchoring base element which accepts and engages a removable flexible cap or covering element formed of impermeable elastic material. The cap is retained in the base element by interference fit. When united, the base and cap components provide a protective and/or decorative cover for a common fastening device such as a screw. U.S. Pat. No. 4,460,300 comprises a fastener with a head cap having a concealed edge. A screw-type fastener has a radially enlarged driving head and a thin walled head conforming cap having a skirt which is designed to be folded inwardly beneath the head in a lapped condition beneath the head to conceal the exposed edge of the skirt between an exposed clamping surface of the cap and the under surface of the head of the fastener. U.S. Pat. No. 4,601,624 consists of a two piece fastener head cover assembly fashioned from resilient plastic for decoratively covering the head of an installed fastener such as a screw or the like. The assembly includes a resilient anchor member adapted to be held by the fastener or screw upon the planar portion of a workpiece. A cup-like, resilient plastic cover plate adapted to be snap-fitted upon the anchor includes a generally convex top portion and a peripheral downwardly projecting rim. U.S. Pat. No. 4,900,206 describes a nut with cover. A cover of synthetic resin is formed within a stepped recess of a nut adjacent the upper end of the internally threaded portion by injection molding. U.S. Pat. No. 4,948,319 discloses a screw/cap assembly and method of manufacture. A screw/cap assembly is formed by bonding an initially separate cap onto the head of a screw by means of an adhesive, such as an epoxy resin sufficiently strong to allow the screw to be driven while the cap is in place. U.S. Pat. No. 4,993,902 includes a plastic capped lock nut having a metal body having a threaded bore extending axially between transverse opposite end faces and includes an annular wall extending outwardly of one of the end faces to define an open ended cavity in coaxial alignment with the threaded bore. An end cap of plastic material including an annular side wall and outer end engages the lock ring and is sonically welded thereto. U.S. Pat. No. 5,338,141 shows a corrosion resistant cap for a fastener. The cap has a hollow head forming a cavity into which the head of the washer is placed, a perimeter outer skirt, and an inner skirt which can be waged or bent from a longitudinal position to a transverse position perpendicular to the axis of the fastener to make contact and cover the lower surface of the flange of the fastener. U.S. Pat. No. 5,350,266 defines a plastic capped nut, wherein the nut has a relatively flat external side faces symmetrically located about a central axis, the side faces being symmetrical on opposite sides of a central plane perpendicular to the axis of the nut. Each of the side faces has to axially extending slots formed therein on opposite sides of the central plane. U.S. Pat. No. 5,480,273 depicts a bolt assembly having a knob having an aperture formed in a hub. The hub includes three ears extended radially outward. The bolt is engaged in the aperture and includes a head engaged in the hub.

DISCLOSURE OF INVENTION

The present invention is directed to a fastening assembly for use in conjunction with common fasteners such as a screws, bolts, and the like. The fastening assembly covers the head of the common fastener and thereby both provides an obstruction to tampering and unauthorized access, and adds a decorative appearance to the otherwise unattractive common fastener.

The fastening assembly consists of two parts, a base member and a cap. Once the common fastener is inserted through a hole in the base member, the cap is installed over the head of the common fastener and is captively held in place by barbs on the cap which engage apertures in the base member. Alternatively, the apertures may be located in the cap and the barbs (in this embodiment designated "catches") in the base member. In the installed configuration, the rim of the cap rests below the open end of the base member, making it difficult to remove the cap and thereby providing tamper resistance. An additional advantage of the present invention is that by covering the common fastener, a level of corrosion resistance is also provided. In terms of ornamental appearance, the base member and cap may be fashioned in various sizes and have numerous external shapes to accommodate the particular needs of the user.

In accordance with a preferred embodiment of the invention, the fastening assembly includes a ring-shaped base member having an open first end and having a washer-shaped element circumferentially connected to an opposite second end. The washer-shaped element has a hole sized to accept the shank portion of the common fastener but not the head portion. The base member further has a plurality of circumferentially spaced apertures.

In accordance with another preferred embodiment of the invention, the fastening assembly further includes a bowl-shaped cap having a rim. The cap has a corresponding plurality of circumferentially spaced resilient legs protruding from the rim, the legs have ends forming outwardly facing barbs, so that when the cap is inserted into the base member the barbs snap into the apertures and are captively engaged thereby.

In accordance with an important feature of the invention, the location of the apertures and barbs is reversed, wherein the apertures are on the cap and the barbs ("catches") are on the base member.

In accordance with an important aspect of the invention, the base member further includes an inner surface having a corresponding plurality of circumferentially spaced ledges, so that when the cap is inserted into the base member, the rim rests upon the ledges in a position below the open first end of the base member.

In accordance with another important feature of the invention, the cap is fabricated from a plateable polymer.

In accordance with another important feature of the invention, the plateable polymer is ABS.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a top plan view of the ring-shaped base member;

FIG. 2 is a bottom plan view of the base member;

FIG. 3 is a side elevation view of the base member;

FIG. 4 is a cross sectional view of the base member along the line 4—4 of FIG. 1;

FIG. 5 is a perspective view of the base member;

FIG. 11 is an exploded perspective view of the fastening assembly and common fastener;

FIG. 12 is a perspective view of the cap installed in the base member;

FIG. 13 is an enlarged cross sectional view of the cap installed in the base member along the line 13—13 of FIG. 12;

FIG. 14 is an enlarged view in direction 14 of FIG. 12;

FIG. 15 is a top plan view of a second embodiment of the ring-shaped base member;

FIG. 16 is a bottom plan view of the second embodiment of the base member;

FIG. 17 is a side elevation view of the second embodiment of the base member;

FIG. 18 is a cross sectional view of the second embodiment of the base member along the line 18—18 of FIG. 15;

FIG. 19 is a perspective view of the second embodiment of the base member;

FIG. 20 is an exploded perspective view of a second embodiment of fastening assembly and common fastener;

FIG. 21 is a top plan view of the ring-shaped base member of the second embodiment; and, FIG. 22 is an enlarged cross sectional view along the line 22—22 of FIG. 21.

MODES FOR CARRYING OUT THE INVENTION

Figure 6:
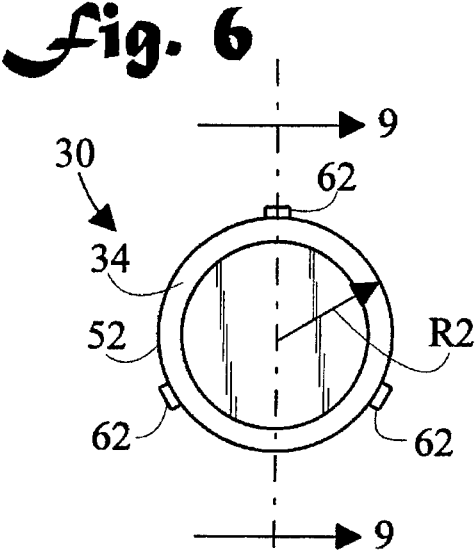
FIG. 6 is a top plan view of the bowl-shaped cap.
Figure 7:
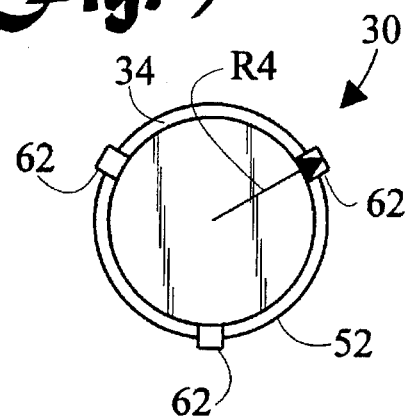
FIG. 7 is a bottom plan view of the cap.

Referring initially to FIGS. 1–5 and 11, there is illustrated a two part fastening assembly in accordance with the present invention, generally designated as 30. Fastening assembly 30 is comprised of two parts, a ring-shaped base member 32 and a bowl-shaped cap 34, and is designed for use with a common fastener 500 such as a screw, bolt, or the like, the common fastener having a head portion 502 and a shank portion 504. Substantially ring-shaped base member 32 has an open first end 36, and has a washer-shaped element 38 circumferentially connected to opposite second end 40. Washer-shaped element 38 has a hole 42 sized to accept the shank portion 504 of common fastener 500 but not to accept head portion 502. Base member 32 has an inside radius R1, and a first central axis 44 oriented perpendicular to washer-shaped element 38. Base member 32 further includes a plurality of circumferentially spaced apertures 48 (also refer to FIGS. 13 and 14). In the shown preferred embodiment three apertures 48 are included, however two, four, or a higher number could alternatively be utilized. In the shown preferred embodiment, apertures 48 consist of through holes in base member 32. However, apertures 48 could also be in the form of non-penetrating recesses in inner surface 53 of base member 32. Base member 32 can be fabricated by injection molding from a polymer such as ABS, or could alternatively be made of other materials such as metal or even wood.

Figure 8:
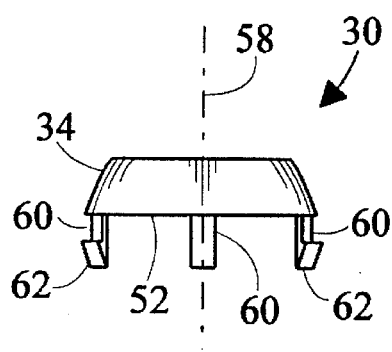
FIG. 8 is a side elevation view of the cap.
Figure 9:
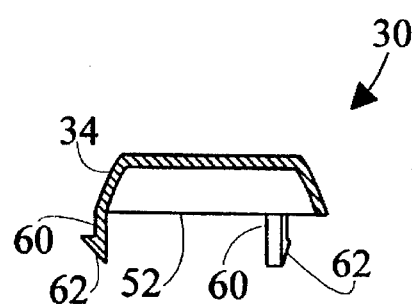
FIG. 9 is a cross sectional view of the cap along the line 9—9 of FIG. 6.
Figure 10:
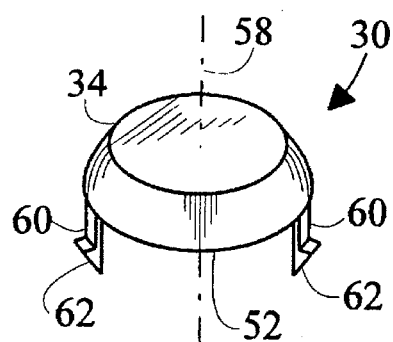
FIG. 10 is a perspective view of the cap.

In a preferred embodiment, base member 32 further includes a corresponding plurality of circumferentially spaced ledges 50 having an inside radius R3 which is greater than radius R2 of cap 34(refer to FIG. 6), so that when cap 34 is inserted into base member 32, rim 52 of cap 34 (refer also to FIGS. 11 and 13) rests upon ledges 50 in a position below open first end 36, but above head 502 of common fastener 500. Ledges 50 have a height H1 which is low enough to allow barbs 52 (refer to FIG. 8) to be captively engaged by the tops 66 of apertures 48. In a preferred embodiment the number of ledges 50 is equal to the number of apertures 48, three as shown, with ledges 50 being interleaved between apertures 48.

Base member 32 further includes an outer surface 54 having a corresponding plurality of radially protruding hollowed-out ears 56, each ear 56 surrounding an aperture 48 (refer also to FIG. 14).

Referring now to FIGS. 6–10, there is depicted the second part of fastening assembly 30, the substantially bowl-shaped cap 34 having a rim 52 having an outside radius R2 which is slightly less than inside radius R1 of base member 32 (refer also to FIG. 1). Cap 34 has a second central axis 58 oriented perpendicular to rim 52. Cap 34 further has a corresponding plurality of circumferentially spaced resilient legs 60 protruding from rim 52. There are as many legs 60 as there are apertures 48 in base member 32, three in the shown embodiment (refer to FIG. 2). Legs 60 extend in a direction parallel to second central axis 58. Legs 60 have ends forming outwardly facing barbs 62 which extend outward to a radius R4 which is greater than inside radius R1 of base member 32 (refer to FIG. 1). When cap 34 is inserted into base member 32, legs 60 are urged inward by base member 32, and barbs 62 resiliently snap into apertures 48 and are captively engaged, thereby locking cap 34 in place within base member 32.

Cap 32 is preferably fabricated by injection molding from a plateable polymer such as ABS, so that cap 32 may be plated with a metallic finish of a gold, silver, or bronze color to result in an aesthetically pleasing appearance. The polymer must be chosen so that legs 60 are resilient, and will bend inward upon insertion into base member 32, and then resiliently snap into apertures 48.

FIG. 11 is an exploded perspective view of fastening assembly 30 and common fastener 500. Head 502 of common fastener 500 is covered by inserting shank portion 504 through hole 42 in base member 32 in direction 64 until head 502 abuts washer-shaped element 38(refer to FIG. 13). Legs 60 of cap 34 are aligned with corresponding apertures 48 of base member 32. Cap 34 is then inserted in direction 64 into base member 32 so that cap 34 covers head 502 of common fastener 500 and barbs 62 snap into apertures 48 and are captively engaged thereby.

FIG. 12 is a perspective view of cap 34 captively installed in the base member 32, and covering common fastener 500.

FIG. 13 is an enlarged cross sectional view of the cap 34 installed in base member 32 along the line 13—13 of FIG. 12. Barb 62 resiliently snaps into aperture 48 and is captively retained by the top of the aperture 66 which is a portion of base member 32. Cap 34 rests on ledges 50 which prevents cap 34 from contacting head 502 of common fastener 500. In this position, rim 52 of cap 34 is below first open end 36 of base member 32. Therefore, without using a thin-bladed knife or similar tool, it is very difficult to disengaged cap 34 from base member 32. This constitutes the tamper resistant feature of the present invention.

FIG. 14 is a view in the direction 14 of FIG. 12. Barb 62 has snapped in to aperture 48 and is captively retained by the top of the aperture 66. Barb 62 may be disengaged from aperture 48 by placing a pointed instrument into aperture 48 and pressing inwardly in direction 68 (refer to FIG. 13).

Referring now to FIGS. 15-19, there is depicted a second embodiment of the ring-shaped base member, generally designated as 132. Base member 132 is very similar to first base member embodiment 32, having an open first end 136 and a washer-shaped element 138 circumferentially connected to opposite second end 140. Washer-shaped element 138 has a hole 142 sized to accept the shank portion 504 of common fastener 500 but not to accept head portion 502. Base member 132 has an inside radius R1', and a first central axis 144 oriented perpendicular to washer-shaped element 138. Base member 132 further includes a plurality of circumferentially spaced apertures 148. In the shown preferred embodiment three apertures 48 are included, however two, four, or a higher number could alternatively be utilized.

Rather than having the ears of first base member embodiment 32, base member 132 has an outer skirt 133 which is integral with and emanates from first open end 136 and surrounds the entire base member 132.

It may be appreciated that numerous other external shapes of cap 34, and base members 32 and 132, are also possible, so long as the barbs and barb-engaging apertures are present.

FIG. 20 is an exploded perspective view of a second embodiment of a fastening assembly and common fastener, generally designated as 230. In this embodiment the location of apertures 248 and catches 262 have been reversed. In this embodiment, the term "catch" (v. "barb") is a better describer. A plurality of circumferentially spaced apertures 248 are located in cap 234, and a corresponding plurality of inwardly facing catches 262 are integral with inner surface 253 of base member 232. Catches 262 extend inwardly to a radius R5 which is less than the outside radius R2 of cap 234, so that when cap 234 is inserted into base member 232, apertures 248 snap around catches 262 and are captively engaged thereby(refer also to FIG. 21).

FIG. 21 is a top plan view of base member 232, and FIG. 22 is an enlarged cross sectional view of catch 262 along the line 22—22 of FIG. 21.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A fastening assembly for use with a common fastener such as a screw, bolt, or the like, the common fastener having a head portion and a shank portion, the fastening assembly comprising:

a substantially ring-shaped base member having an open first end and having a washer-shaped element circumferentially connected to an opposite second end, said washer-shaped element having a hole sized to accept the shank portion of the common fastener but not the head portion, said base member having an inside radius R1, said base member having a first central axis perpendicular to said washer-shaped element, said base member having a plurality of circumferentially spaced apertures; and, a substantially bowl-shaped cap having a rim, said rim having an outside radius R2 slightly less than said inside radius R1 of said base member, said cap having a second central axis perpendicular to said rim, said cap having a corresponding plurality of circumferentially spaced resilient legs protruding from said rim, said legs extending in a direction parallel to said second central axis, said legs having ends forming outwardly facing barbs, said barbs extending outward to a radius R4 which is greater than said inside radius R1 of said base member, so that when said cap is inserted into said base member said barbs snap into said apertures and are captively engaged thereby.

2. A fastening assembly according to claim 1, said base member further including an inner surface having a corresponding plurality of circumferentially spaced ledges, said ledges having an inside radius R3 which is greater than said radius R2 of cap, so that when said cap is inserted into said base member, said rim rests upon said ledges in a position below said open first end of said base member.

3. A fastening assembly according to claim 1, said base member further including an outer surface, said outer surface having a corresponding plurality of radially protruding hollowed-out ears, said ears surrounding said apertures.

4. A fastening assembly according to claim 1, said base member further including an outer skirt, said skirt integral with and emanating from said first open end and surrounding said base member.

5. A fastening assembly according to claim 1, said cap fabricated from a plateable polymer.

6. A fastening assembly according to claim 5, wherein said plateable polymer is ABS.

7. A fastening assembly for use with a common fastener such as a screw, bolt, or the like, the common fastener having a head portion and a shank portion, the fastening assembly comprising:

a substantially ring-shaped base member having an open first end and having a washer-shaped element circumferentially connected to an opposite second end, said washer-shaped element having a hole sized to accept the shank portion of the common fastener but not the head portion, said base member having an inside radius R1, said base member having a first central axis perpendicular to said washer-shaped element, said base member having an inner surface having a plurality of circumferentially spaced catches, said catches extending inwardly to a radius R5; and, a substantially bowl-shaped cap having a rim, said rim having an outside radius R2 slightly less than said inside radius R1 of said base member but greater that said radius R5 of said barbs, said cap having a second central axis perpendicular to said rim, said cap having a corresponding plurality of circumferentially spaced apertures, so that when said cap is inserted into said base member said apertures snap around said catches and are captively engaged thereby.

8. A method for covering the head of a common fastener such as a screw, bolt, or the like, the common fastener having a head portion and a shank portion, comprising the steps of:

providing a fastening assembly comprising (a) a substantially ring-shaped base member having a washer-shaped element having a hole, and having a plurality of circumferentially spaced apertures, and (b) a substantially bowl-shaped cap having a corresponding plurality of circumferentially spaced resilient legs, said legs having ends forming outwardly facing barbs;

inserting the shank portion of the common fastener through said base member and into said hole until the head of the common fastener abuts said washer-shaped element;

aligning said plurality of circumferentially spaced resilient legs with said plurality of circumferentially spaced apertures; and, inserting said cap into said base member so that said cap covers the head of the common fastener and said barbs snap into said apertures and are captively engaged thereby.

* * * * *